United States Patent [19]
DeBonne et al.

[11] Patent Number: 5,964,185
[45] Date of Patent: Oct. 12, 1999

[54] FEEDING INSTALLATION, AND VALVE FOR USE IN SUCH AN INSTALLATION

[75] Inventors: Christophe Roger Antoon DeBonne, Maldegem; Antoine Achiel Vandaele, Eeklo, both of Belgium

[73] Assignee: Roxell, N.V., Bulgaria

[21] Appl. No.: 08/938,430

[22] Filed: Sep. 26, 1997

[30] Foreign Application Priority Data

Sep. 30, 1996 [NL] Netherlands ............................ 1004149

[51] Int. Cl.⁶ .................................................. A01K 5/02
[52] U.S. Cl. .......................................... 119/57.4; 119/56.2
[58] Field of Search ................... 119/51.11, 56.1, 119/56.2, 57.4

[56] References Cited

U.S. PATENT DOCUMENTS 901,620  10/1908  Jenkins .................................... 119/56.1

5,483,923  1/1996  Sabbara ................................ 119/51.11

FOREIGN PATENT DOCUMENTS

| 645 186 | 1/1964 | Belgium . |
| 0 177 083 | 4/1986 | European Pat. Off. . |
| 28 56 776 A1 | 7/1980 | Germany . |
| 43 17 840 | 11/1994 | Germany . |
| 9 401 783 | 6/1996 | Netherlands . |

*Primary Examiner*—Robert P. Swiatek
*Attorney, Agent, or Firm*—Deveau, Colton & Marquis

[57] ABSTRACT

A feeding installation has at least two feed containers from which feeds of different composition are conveyed by means of a feed conveying device to feeding devices. The feeding devices are connected to the feed conveying device by way of valves. The valves have two or more slide elements which are slidable relative to each other and are provided with an opening, for allowing or blocking the passage of feed.

17 Claims, 5 Drawing Sheets

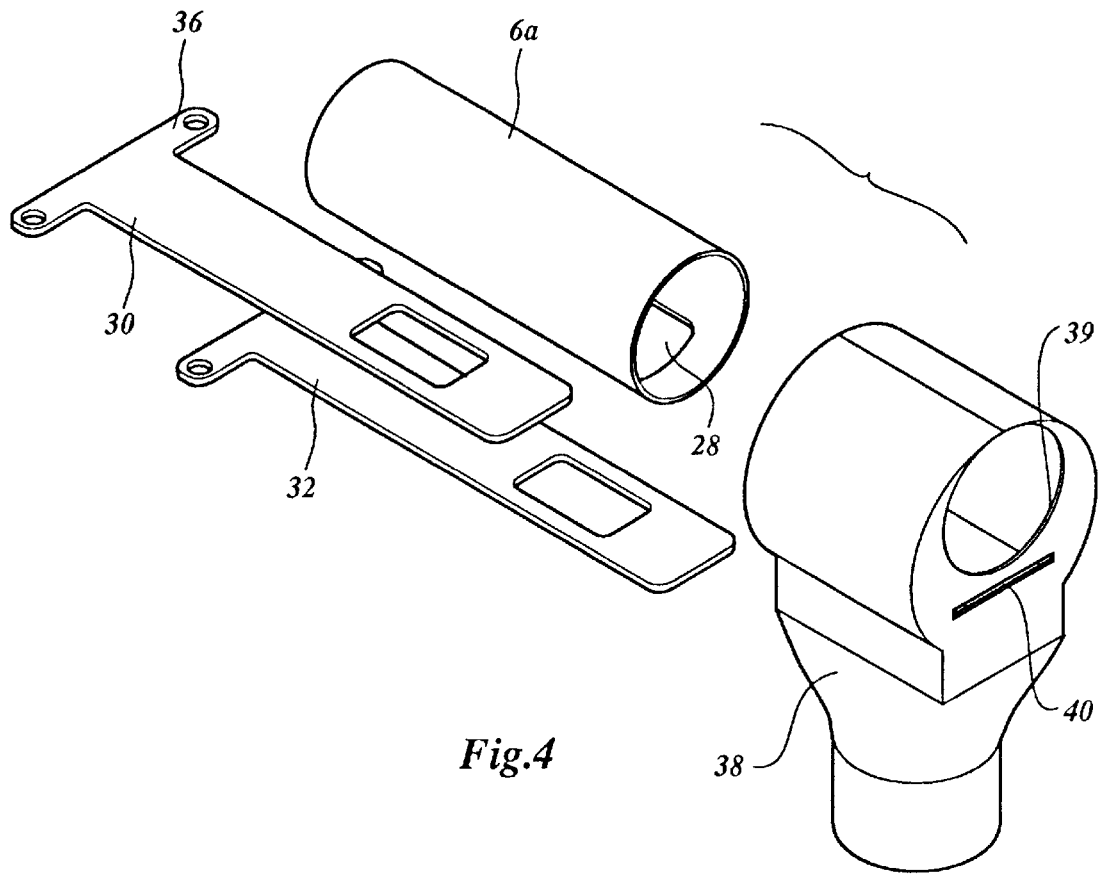
*Fig.4*
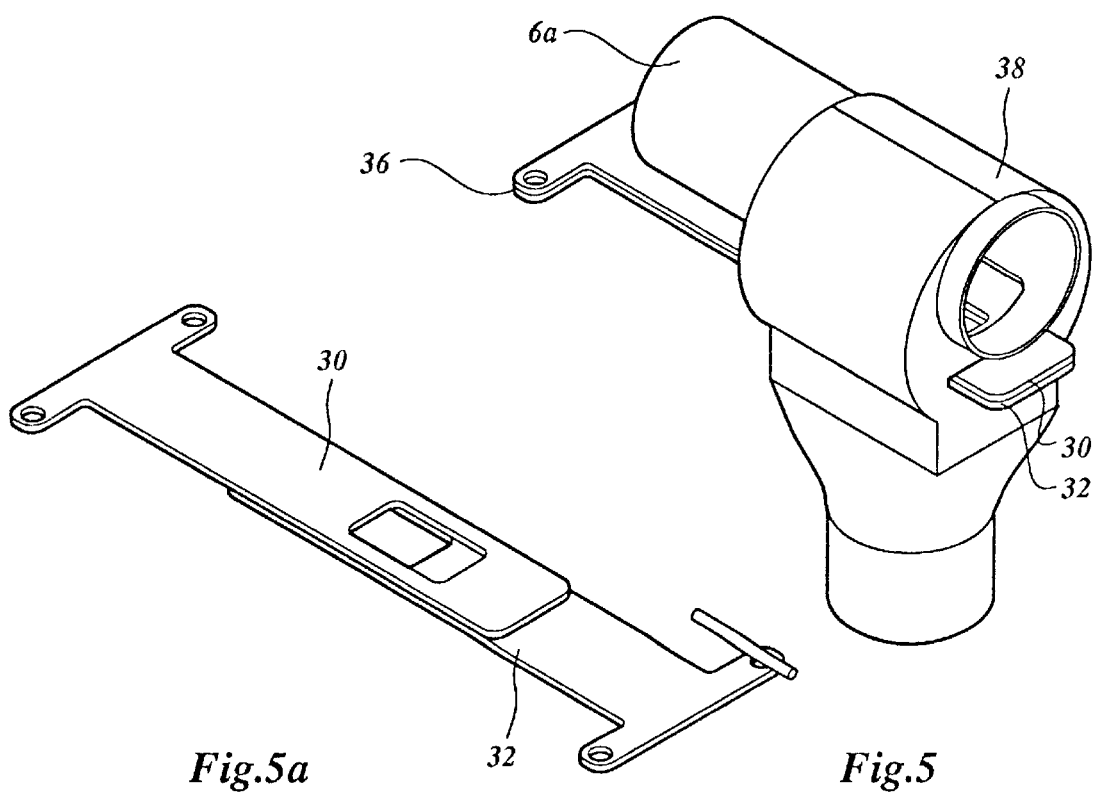
*Fig.5a*  *Fig.5*

FEEDING INSTALLATION, AND VALVE FOR USE IN SUCH AN INSTALLATION

BACKGROUND OF THE INVENTION

This invention relates to a feeding installation for feeding animals with different feeds, comprising: at least two feed containers each containing a feed, the feeds differing from each other in composition; at least two feeding devices each disposed at a feeding point for providing feed to an animal at the feeding point; a feed conveying device for conveying feed along a predetermined path from one of the feed containers to at least one of the feeding devices, the feeding devices being connected to the feed conveying device by branches of the feed conveying device, which branches each comprise at least a controllable valve with at least a blocking position, in which the valve allows no feed through from the feed conveying device to the feeding device, and a passage position, in which the valve allows the passage of feed from the feed conveying device to the feeding device, the valve comprising a passage opening which can be shut off by a slide element which has at least a first, closed region for blocking the supply of feed from the feed conveying device to the feeding device, and at least a second region with an opening for allowing the passage of feed from the feed conveying device to the feeding device. This invention also relates to a valve for use in such a feeding installation.

DISCUSSION OF THE PRIOR ART

Said feeding installations are known by the name of "multi-phase feeding installations". In such an installation feeds of different compositions are conveyed by a single feed conveying device to different, predetermined feeding devices, so that an animal which is meant to be fed from a specific feeding device can be fed in the optimum manner (and differently from other animals which are meant to be fed from other feeding devices). This selective feeding is carried out by means of a suitable shape and control of the valves of the feeding installation by placing only certain valves in the passage position during conveyance of a specific feed in the feed conveying device, and placing certain other valves in the passage position during the conveyance of another feed in the feed conveying device.

SUMMARY OF THE INVENTION

The object of the invention is to provide a feeding installation of the abovementioned type which by simple means enables the feeding installation to process a large number of different feeds and supply them to an equally large number of different feeding devices.

This object is attained in the feeding installation according to the invention wherein each valve is provided with at least a second slide element which has at least a first closed region for blocking the supply of feed from the feed conveying device to the feeding device, and has at least a second region with an opening for allowing the passage of feed from the feed conveying device to the feeding device, and wherein the first slide element and the second slide element at least in the region of the passage opening of the valve overlap and generally are adjacent to each other.

The claims and advantages will be more readily appreciated as the same becomes better understood by reference to the following detailed description and considered in connection with the accompanying drawings in which the same reference numbers relate to the same parts or parts with the same function.

BRIEF DESCRIPTION OF THE DRAWINGS

FIG. 4 shows in perspective a second embodiment of a valve according to the invention, in disassembled form;

FIG. 5 shows the valve according to FIG. 4 in assembled form;

FIG. 5a shows an alternative arrangement of the slide elements of the valve according to FIG. 5;

DESCRIPTION OF THE PREFERRED EMBODIMENTS

Figure 1:
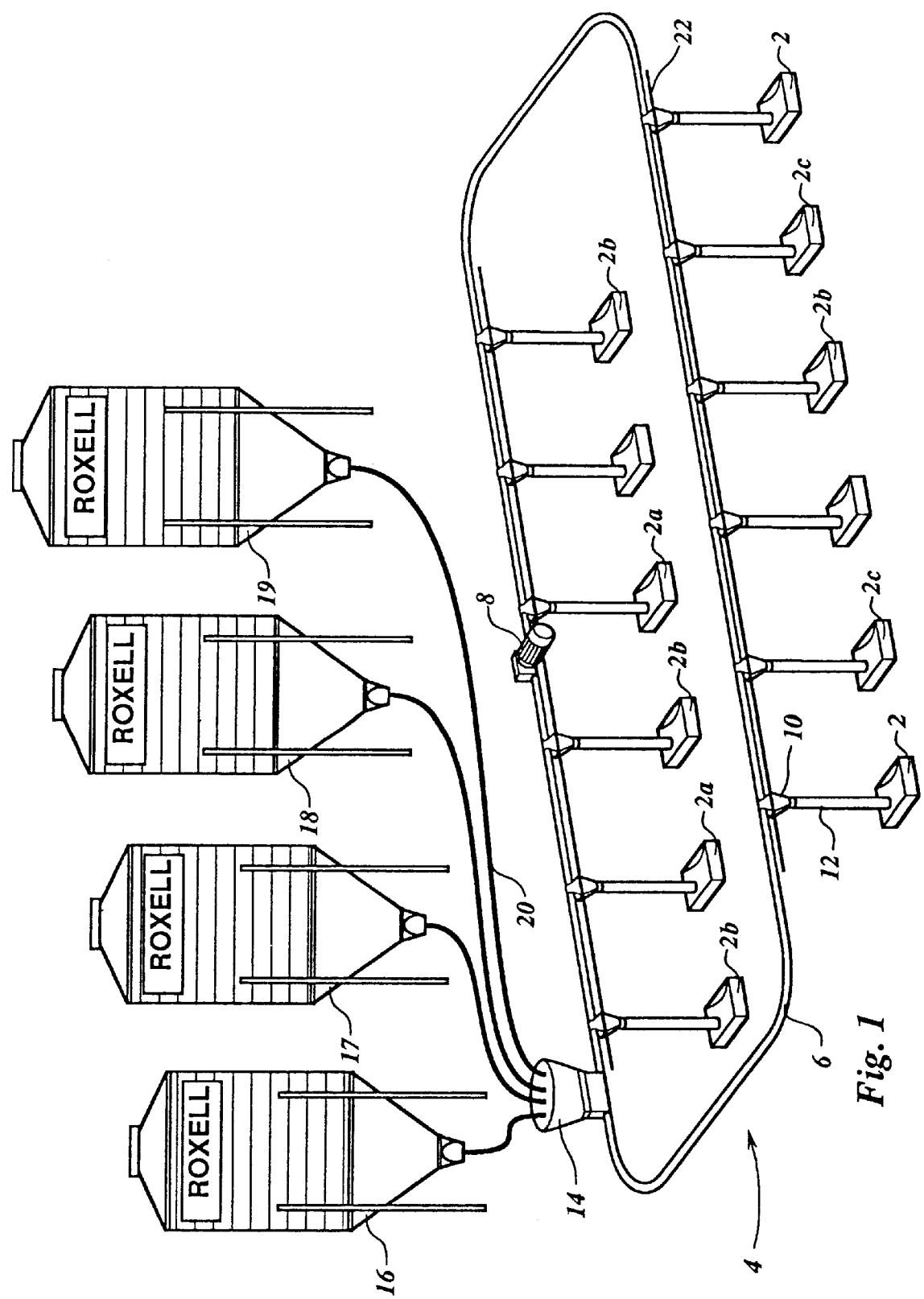
FIG. 1 shows a diagrammatic view, partially in perspective, of a feeding installation according to the invention.

FIG. 1 shows a multi-phase feeding installation in which a number of feeding devices 2 are disposed for feeding animals such as pigs and other livestock. The feeding devices 2 are usually disposed in separate areas (not shown in any further detail) of a building in which the animals are housed. Along the feeding devices 2 runs a feed conveying device 4, comprising a tube 6 with conveyor means, such as a helically curved strip, driven by a suitable drive 8, for moving feed in the tube 6. At the position of the feeding devices 2, controllable valves 10 are fitted on the tube 6, which valves can be opened and closed for allowing or blocking the supply of feed from the tube 6 by way of a branch tube 12 to a feeding device 2. Feed can be supplied to the tube 6 by means of a hopper 14, which can be filled from one of a number of feed containers 16, 17, 18 or 19 by way of respective lines 20 which are shown only diagrammatically. The feed containers 16–19 each contain a feed whose composition differs from that of the feeds in the other feed containers.

In order to illustrate the mode of operation of the feeding installation, by way of example, feed must be supplied from feed container 16 to feeding devices 2a, feed from feed container 17 to feeding devices 2b, feed from feed container 18 to feeding devices 2c, and feed from feed container 19 to the remaining feeding devices, on the basis of the different feed requirements of the animals eating from the respective feeding devices. To this end, the feeding installation is provided with a central control mechanism for all valves 10 simultaneously, which control mechanism is shown diagrammatically in FIG. 1 in the form of a line 22. The valves belonging to the feeding devices 2a can be opened by the control mechanism 22 in a first position thereof, the other valves being closed, while in a respective second, third and fourth position of the control mechanism 22 only the valves 10 belonging to the respective feeding devices 2b, 2c or the other feeding devices are opened. In the first position of the control mechanism, feed is transferred from the feed container 16 to the hopper 14 and circulated in the tube 6. The feed then goes only into the feeding devices 2a. In the second position of the control mechanism 22, feed is taken out of the feed container 17 and passes by way of the hopper 14 into the tube 6, said feed going only into the feeding devices 2b. In the third position of the control mechanism 22, feed which has been taken out of the feed container 18 and moved by way of the hopper 14 into the tube 6 goes only into the feeding devices 2c. In the fourth position of the control mechanism 22, feed is taken out of the feed container 19 and moved by way of the hopper 14 and the tube 6 into feeding devices other than the feeding devices 2a, 2b and 2c. The mode of operation described above is obtained by means of the valves described in greater detail below.

Figure 2:
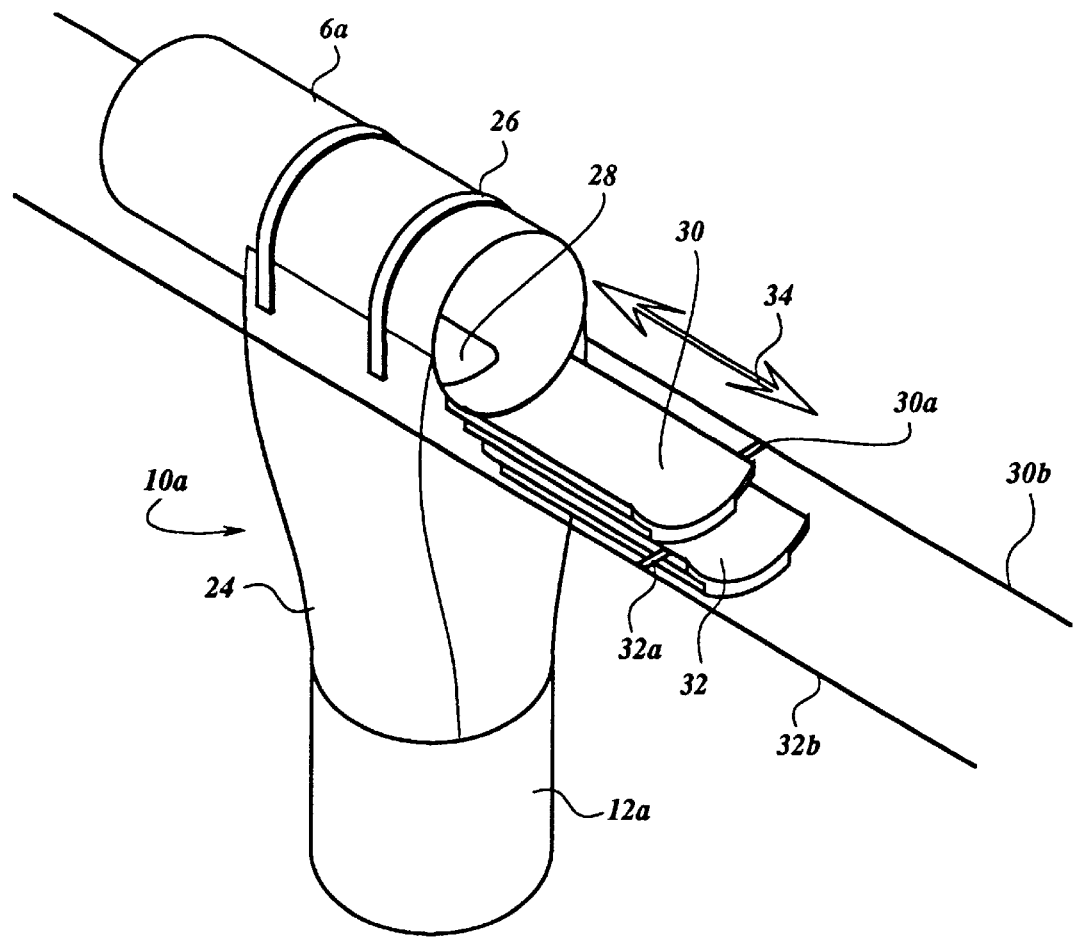
FIG. 2 shows in perspective diagrammatically a valve according to the invention.

FIG. 2 shows a valve 10a, comprising a tubular part 6a which is intended for accommodation in the tube 6, and a collar 12a which is intended to be connected to the branch tube 12, the collar 12a being connected to the tubular part 6a by means of a hollow connecting piece 24 and strips 26. The tubular part 6a is provided with a passage opening 28, through which the space inside the tubular part 6a can be placed in communication with the space inside the connecting piece 24 and the collar 12a. Two slides 30 and 32 are slidably fitted below the passage opening 28, which slides are slidably mounted in the connecting piece 24, and can be moved in the directions of the double arrow 34 by the fact that slide 30 is connected by means of a connecting piece 30a to a pulling wire or rod 30b, and slide 32 is connected by way of a connecting piece 32a to a pulling wire or rod 32b. The slides 30 and 32 are each provided with an opening, by means of which in a first position of slide 30 the passage opening 28 is blocked and in a second position of the slide 30 the opening thereof coincides with the passage opening 28. The same applies to the slide 32. Four combinations of positions of the slides 30 and 32 are therefore possible, in only one combination of these positions a passage from the tubular part 6a to the connecting piece 24 being obtained. This is illustrated in greater detail with reference to FIG. 3.

Figure 3:
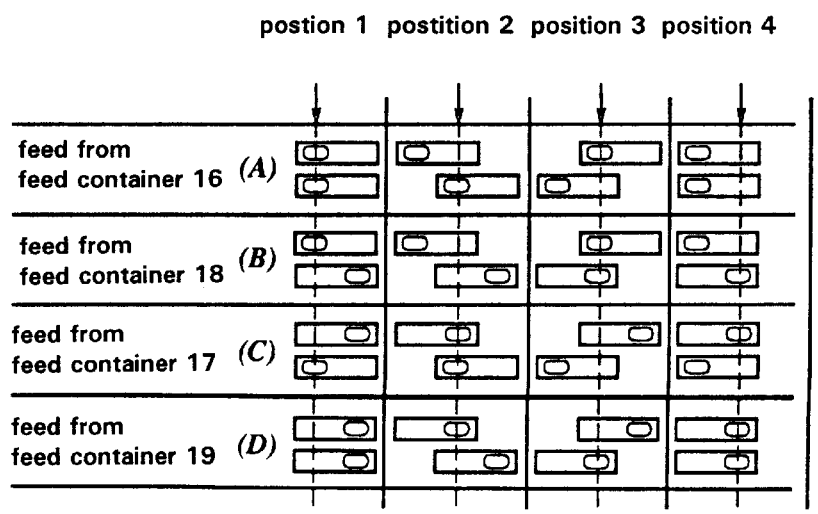
FIG. 3 illustrates the mode of operation of the valve in various configurations.

In FIG. 3 the arrow always indicates the position of the passage opening 28 of the tubular part 6a. In the matrix shown in FIG. 3 the various possible positions of the slides 30 and 32 are shown for various combinations of positions of openings in the slides 30 and 32. The slides 30 and 32 shown in row (A) belong to a valve which in FIG. 1 is situated above the feeding devices 2a, for supplying feed thereto from feed container 16. The slides 30 and 32 shown in rows (B) and (C) belong to valves which in FIG. 1 are disposed above feeding devices 2c and 2b respectively, for supplying thereto feed from feed containers 18 and 17, respectively. The slides 30 and 32 shown in row (D) belong to valves which are disposed above feeding devices 2 shown in FIG. 1, other than feeding devices 2a, 2b and 2c, for supplying feed from feed container 19 to said other feeding devices. It can be seen clearly from FIG. 3 that in position 1 of the valves only the slides 30 and 32 shown under (A) allow feed to pass through. In position 2 only the slides 30 and 32 shown in row (C) allow feed to pass through. In position 3 only the slides 30 and 32 shown in row (B) allow feed to pass through. In position 4 only the slides shown in row (D) allow feed to pass through. A selective supply of feed from a single feed conveying device to four different groups of selected feeding devices is thus possible, by means of a simple slide configuration which is easy to control by means of two centrally controlled pulling wires or rods 30b and 32b. It will be clear that when more than one slide is used numerous variation possibilities are available for fitting a slide configuration within a limited length of the valve which is such that it becomes possible to supply even more different types of feed selectively to feeding devices, while retaining central control of all slides. For example, with three slides, each capable of assuming two positions, it is possible to distribute eight different types of feed selectively. On the other hand, with two slides, each capable of assuming three positions (in which a passage is created in only one position of each slide), a maximum of nine different types of feed can be distributed selectively.

FIGS. 2 and 3 indicate that the slides 30 and 32 in principle can be fully identical, and that only the orientation thereof need be varied for achieving the combinations shown in FIG. 3. In the case of other slides also, with a very limited number of different designs thereof, a relatively very large number of different feeds can be distributed selectively by combination and different orientation.

FIGS. 4 and 5 show a variant of the embodiment of FIG. 2, in which the slides 30 and 32 are provided with laterally projecting arms 36 which are provided with an opening, and by means of which a simple connection can be made to pulling wires or rods running along the valve. The slides 30 and 32 shown in FIG. 4 are easy to form from sheet material. A housing 38 accommodates the tubular part 6a in circular openings 39. The slides 30 and 32 are situated on top of each other, having been guided into slits 40 of the housing 38, under the tubular part 6a when the valve is in the fitted position, as FIG. 5 shows.

FIG. 5a illustrates an alternative orientation of the slides 30 and 32, which corresponds to the configurations shown under (B) and (C) in FIG. 3.

Figure 6:
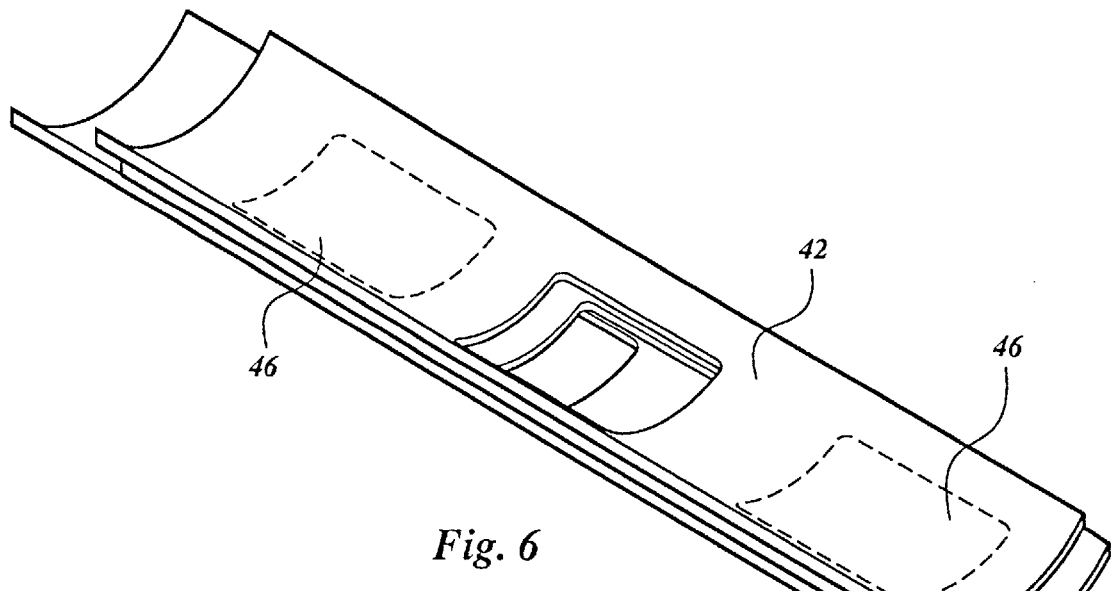
FIG. 6 shows another alternative arrangement of slide elements for a valve according to the invention.

FIG. 6 illustrates diagrammatically that slides are not just flat, but can also be curved in shape. In FIG. 6 there are three slides 42, 43 and 44, each containing an opening in a central part thereof. If, by way of example, valves are designed with slides which can have an opening not just in the place shown in FIG. 6, but instead of that also at one of the places indicated by dashed lines 46, in which case each of the three slides can assume three positions, a maximum of twenty-seven different feeds can be distributed selectively in a feeding installation in which valves with such slide configurations are accommodated.

Figure 7:
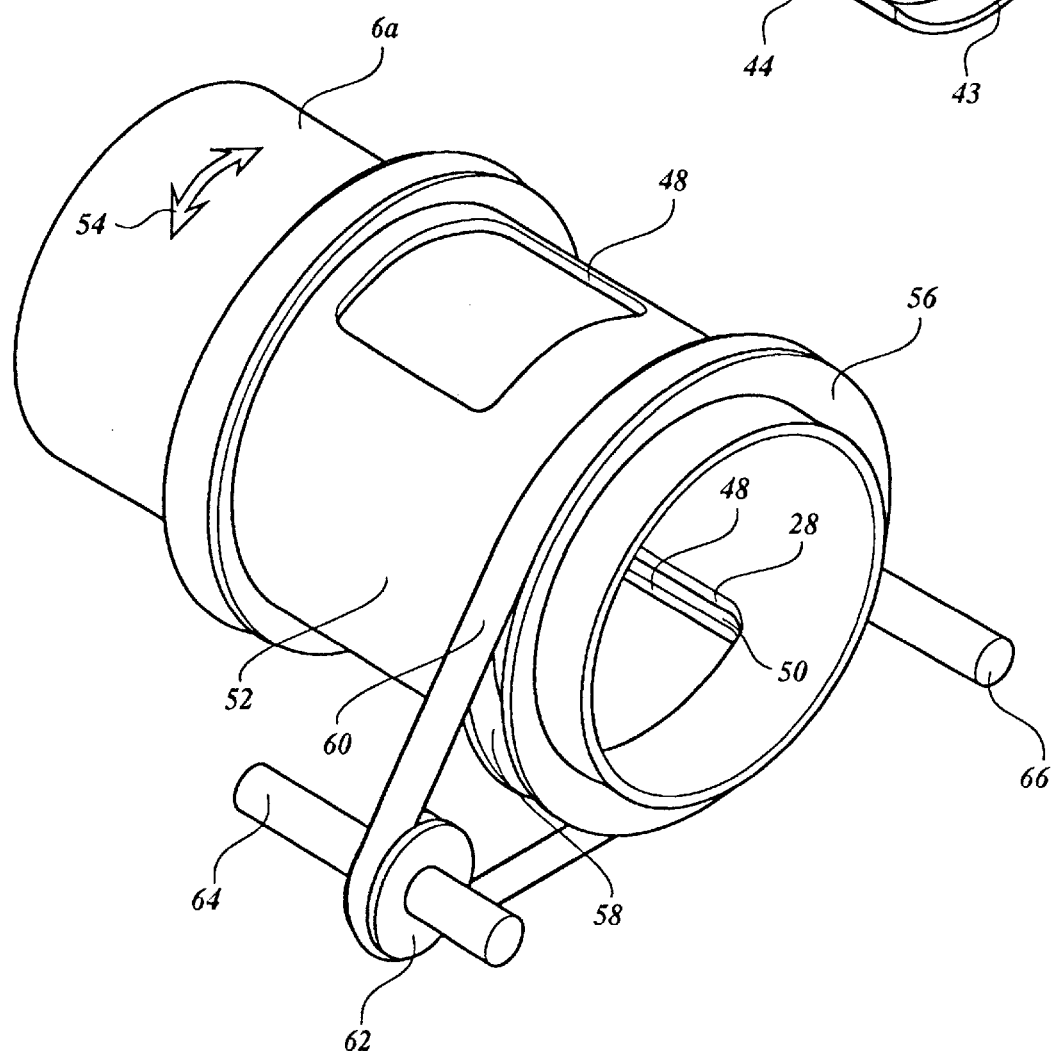
FIG. 7 shows another embodiment of a valve according to the invention.

FIG. 7 shows a tubular part 6a of a valve according to the invention, about which two cylinder-surface-shaped slides 50 and 52 provided with an opening 48 can be rotated in the directions of the double arrow 54. Along one of its edges, the slide 50 is provided with a ring 56 which has a groove 58, so that the slide 50 can be moved by rotation of a shaft 64 by means of a rope 60 passed over a wheel 62. A similar drive is provided for the slide 52 from a shaft 66. One shaft 64, 66 drives various slides 50, 52, respectively, of different valves. Instead of a rope transmission, it is, of course, also possible to use a transmission with a (possibly toothed) belt, a chain or gear wheels for a slip-free transmission.

Figure 8:
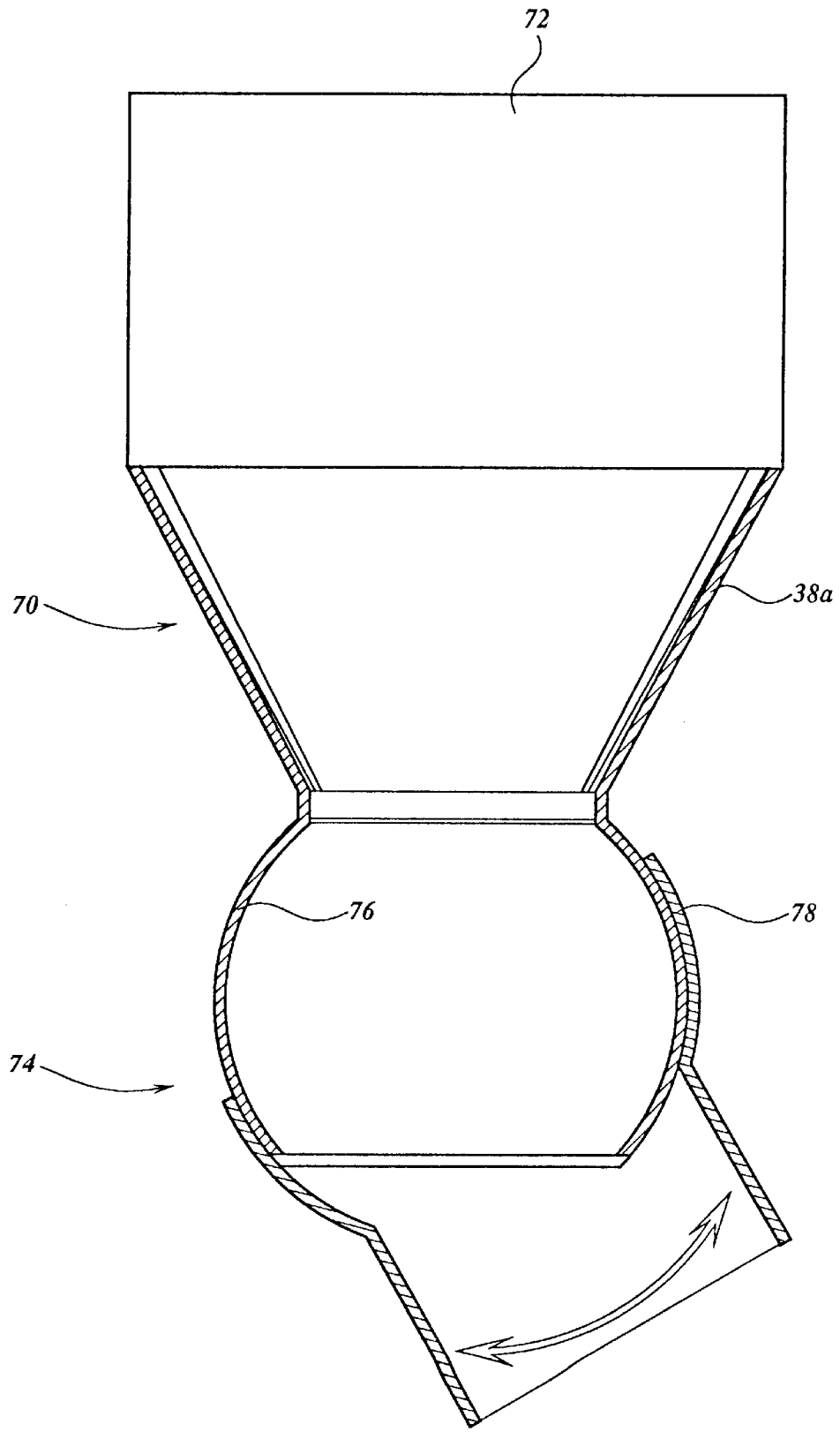
FIG. 8 shows partially in cross section yet another embodiment of a valve according to the invention.

FIG. 8 shows a valve 70, in which the part 72 of the housing 38a intended for connection to a tube of a feed conveying device is not shown in any further detail. The discharge tube or branch tube of the valve 70, through which tube feed, having passed through the part 72 of the valve 70, can flow to a feeding device, comprises a ball joint 74 with a partially spherical inner part 76 and a partially spherical outer part 78. The inner part 76 has a passage through which feed can pass freely. The outer part 78 can rotate freely and tilt about the inner part 76, so that feed flowing through the ball joint 74 can be guided very advantageously in any desired direction falling within the (conical) range of the ball joint 74. This considerably facilitates the arrangement of the feed conveyor system connected to the valve.

In FIG. 8 the ball joint 74 forms a unit with the valve, but it is also possible to manufacture the ball joint separately from the valve and join them together subsequently.

Moreover, the use of the ball joint is not limited to a combination with the valve according to the present invention; the ball joint can also be combined with any desired valve according to the prior art, or can be made integral therewith, in which case the same advantages of any desired feed discharge direction within a particular region are retained.

While the invention has been described and illustrated in its preferred embodiments, it should be understood that departures may be made therefrom within the scope of the invention, which is not limited to the details disclosed herein.

What is claimed is:

1. A feeding installation for feeding animals with different feeds, comprising:

at least two feed containers each for containing a feed, the feeds differing from each other in composition;

at least two feeding devices each disposed at a feeding point for providing feed to an animal at said feeding point;

a feed conveying device for conveying feed along a predetermined path from any one of said feed containers to any one or more of said feeding devices, said feeding devices being connected to said feed conveying device by branches of said feed conveying device, which branches each comprise a controllable valve with at least one blocking position wherein said valve allows no feed through from said feed conveying device to said feeding device, and a passage position wherein said valve allows the passage of feed from said feed conveying device to said feeding device, said valve comprising a passage opening which can be shut off by a first slide element which has at least a first, closed region for blocking the supply of feed from said feed conveying device to said feeding device, and at least a second region with an opening for allowing the passage of feed from said feed conveying device to said feeding device, each valve further comprising a second slide element which has at least a first closed region for blocking the supply of feed from said feed conveying device to said feeding device, and has at least a second region with an opening for allowing the passage of feed from said feed conveying device to said feeding device, wherein said first slide element and said second slide element at least in the region of said passage opening of said valve overlap in close proximity to each other.

2. The feeding installation of claim 1, wherein the valve comprises a substantially tubular body in which the passage opening is made.

3. The feeding installation of claim 1, wherein said slide elements comprise strips in which an opening is made in a predetermined region.

4. The feeding installation of claim 3, wherein said slide elements of said valves are controlled by means of pulling wires or rods.

5. The feeding installation of claim 3, wherein said strips are generally curved about their longitudinal axes.

6. The feeding installation of claim 3, wherein said strips are generally curved about their transverse axes.

7. The feeding installation of claim 1, wherein said slide elements comprise cylinder-surface-shaped parts in which an opening is made in a predetermined region.

8. The feeding installation of claim 7, wherein said slide elements of said valves are controlled by means of a flexible drive.

9. The feeding installation of claim 8, wherein said flexible drive is selected from the group consisting of a rope drive, a belt drive, and a chain drive.

10. The feeding installation of claim 1, wherein at least a number of said slide elements of said valves are controlled centrally.

11. The feeding installation of claim 10, wherein at least a number of said first slide elements of said valves are connected to each other for a synchronous movement thereof.

12. The feeding installation of claim 10, wherein at least a number of said second slide elements of said valves are connected to each other for a synchronous movement thereof.

13. The feeding installation of claim 1, wherein said slide elements of said valves are controlled mechanically.

14. The feeding installation of claim 1, wherein said valve is connected to a branch tube which forms at least part of the connection between the feed conveying device and the feeding device, the branch tube comprising a ball joint which allows feed to pass through.

15. The feeding installation of claim 1, wherein said feed conveying device comprises a loop.

16. The feeding installation of claim 1, wherein said slide elements of said valves are independently moveable from one another.

17. A valve for use in a feeding installation, said valve comprising:

a valve body comprising a passage opening therethrough;

a first slide element comprising a closed region and an opening, and movable between a passage position wherein said opening is at least partially aligned with said passage opening in said valve body, and a blocking position wherein said opening is not aligned with said passage opening in said valve body; and a second slide element comprising a closed region and an opening, and movable between a passage position wherein said opening is at least partially aligned with said passage opening in said valve body, and a blocking position wherein said opening is not aligned with said passage opening in said valve body;

said first slide element and said second slide element at least in the region of said passage opening overlap in close proximity to each other wherein said slide elements of said valves are independently moveable from one another.

* * * * *